May 29, 1956  K. G. BEHLEFELDT  2,747,631
ANGULARLY ADJUSTABLE SAW
Filed Feb. 18, 1954  2 Sheets-Sheet 2
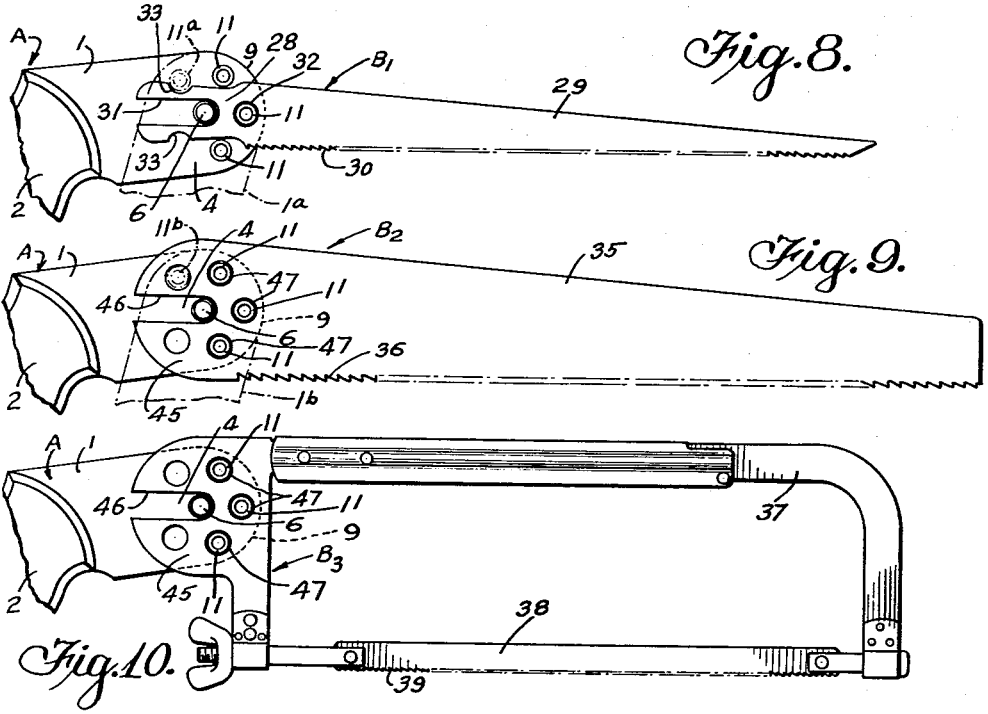
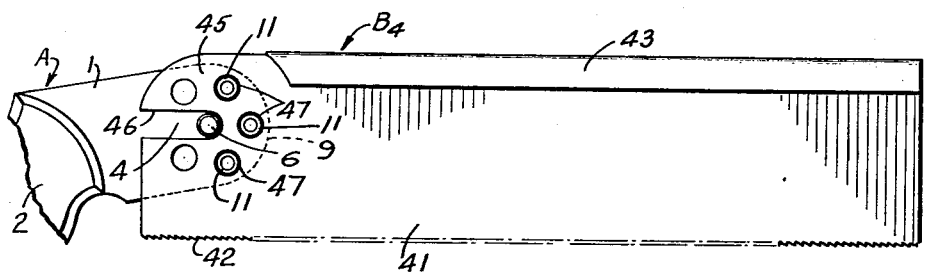
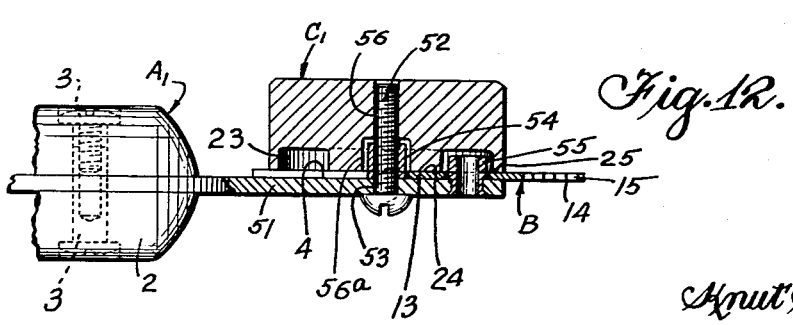
INVENTOR.
Knut G. Behlefeldt.
BY
Knight + Rodgers
ATTORNEYS.

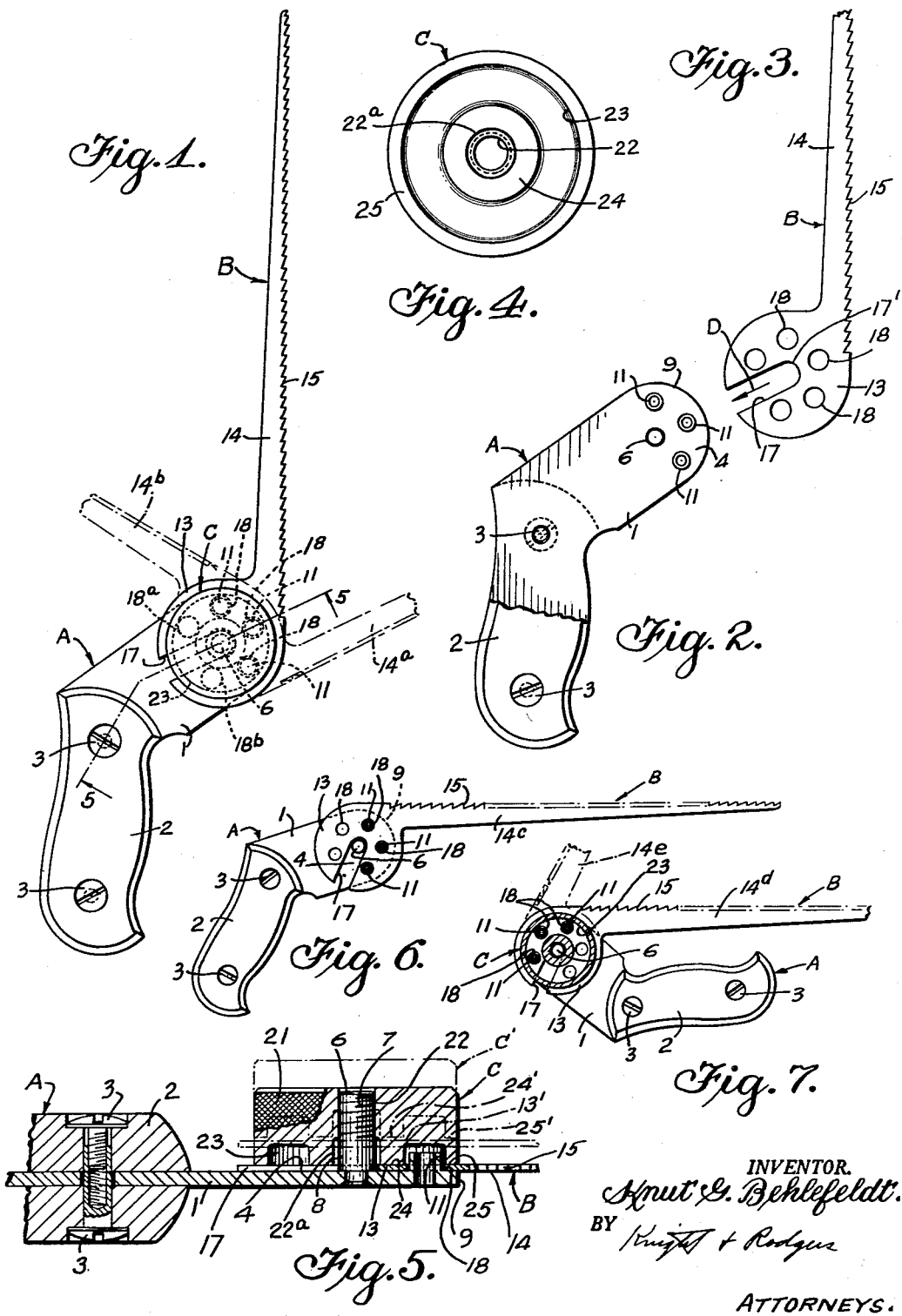

United States Patent Office 2,747,631
Patented May 29, 1956

2,747,631
ANGULARLY ADJUSTABLE SAW

Knut G. Behlefeldt, Los Angeles, Calif.

Application February 18, 1954, Serial No. 411,077

3 Claims. (Cl. 145—108)

This invention relates to hand saws, and more particularly to hand saws of the type having a blade which may be adjusted to different positions relative to the handle.

The principal object of the invention is to provide advantageous means for mounting a saw blade structure on a blade-carrying handle structure, in such manner as to permit ready adjustment of the blade to different angular positions relative to the handle and to provide for rigidly securing the blade structure to the blade-carrying handle structure in any one of such positions.

A particular object of the invention is to provide for adjustment of the blade relative to the handle, in order to provide a convenient disposition of the blade and its toothed edge for use in various kinds of work, and particularly where a sawing operation is to be carried out in a location where an ordinary saw cannot be conveniently used.

A further object is to provide means for easily detaching the saw blade structure from the blade-carrying handle structure, so as to permit different types of blade structures to be mounted interchangeably on a single blade-carrying handle structure.

A further object is to provide for mounting a saw blade structure on a blade-carrying handle structure in either of two relatively reversed positions, so as to bring the toothed edge of the blade structure at either side thereof with respect to a given position of the handle.

Another object is to provide an adjustable saw having a narrow elongated blade, and in which both the blade structure and the blade-carrying handle structure are located wholly at one side of a line extending along the toothed edge of the blade.

The accompanying drawings illustrate adjustable saw constructions in accordance with this invention, and referring thereto:

Fig. 1 is a side elevation of a preferred embodiment of the invention, with the blade structure secured in one angular position relative to the blade-carrying handle structure;

Fig. 2 is a partly broken away side elevation of the blade-carrying handle structure shown in Fig. 1;

Fig. 3 is a partial side elevation of the blade structure shown in Fig. 1;

Fig. 4 is a side elevation of a clamping member shown in Fig. 1, as viewed in the opposite direction;

Fig. 5 is an enlarged sectional view on line 5—5 in Fig. 1;

Fig. 6 is a side elevation of the device shown in Fig. 1, but with the clamping member omitted and the blade disposed in a different position relative to the blade-carrying handle structure;

Fig. 7 is a side elevation showing still another position of the blade structure relative to the blade-carrying handle structure, and with the clamping member shown in vertical section;

Figs. 8, 9, 10 and 11 are side elevations showing different types of blade structures mounted on a blade-carrying handle structure as shown in Fig. 1, with the clamping member omitted; and Fig. 12 is a sectional view similar to Fig. 5 but showing certain modifications in the blade-carrying structure and clamping member.

The form of device shown in Figs. 1 through 7 comprises a blade-carrying handle structure indicated generally at A, a blade structure indicated generally at B, and a clamping member C for firmly securing the blade structure B to the handle structure A in any selected one of various positions.

The blade-carrying handle structure A is shown as comprising a relatively thin mounting plate 1 and a hand grip 2 secured to said mounting plate. The hand grip 2 is relatively thick as compared to the mounting plate 1 and is of such shape as to be readily gripped and held in the hand. It is shown as comprising two parts between which the mounting plate is clamped by suitable means such as bolts 3. The mounting plate 1 projects forwardly beyond the hand grip 2, and this forwardly projecting portion is preferably inclined somewhat relative to the hand grip as shown in Fig. 2. The mounting plate 1 is provided with an extended flat bearing face 4 at one side of the blade adjacent the forward end thereof.

A pivot member 6 is secured to the mounting plate 1 at a position spaced forward from the hand grip 2 and centrally of the bearing face 4, and projects laterally from said bearing face 4 and perpendicular thereto at said one side of the plate. The pivot member 6 is preferably of circular cross section, and the outer end portion thereof is externally threaded as shown at 7, while the inner portion thereof adjacent the plate is preferably smooth-surfaced as shown at 8. It is rigidly secured to the mounting plate to prevent rotation or other movement thereof relative to the plate. The forward end of the mounting plate 1 is preferably of semi-circular shape as shown at 9, being formed as an arc of a circle about the axis of pivot member 6.

A plurality of positioning members 11 of identical shape and size are also secured to the mounting plate 1, and may be formed integrally therewith or rigidly secured thereto in any desired manner. These positioning members also project laterally from the bearing face 4 at said one side of the mounting plate, but they project therefrom a substantially shorter distance than the pivot member 7. These positioning members are preferably also circular in cross section, as shown, but may be of any desired shape.

The positioning members 11 are equally spaced from the pivot member 6, and are spaced angularly from each other about the pivot member. They are preferably also equally spaced from each other, and I have shown three such positioning members spaced at equal angular intervals of approximately 60° to 65° about the axis of the pivot member 6. It will be understood, however, that the number and angular spacing of the positioning member 11 may be varied as desired.

The blade structure B comprises a thin flat base portion 13, preferably of generally circular shape, at the rear end of the blade structure, and an elongated narrow blade portion 14 projecting forwardly from said base portion and having at one side a toothed edge 15 which is shown as substantially tangent to the circular edge of the base portion 13. The blade portion 14 is rigidly secured to the base portion 13 and is preferably formed integrally therewith. The narrow elongated blade portion 14 may be described as offset angularly with respect to the base portion 13. The width of the blade portion 14 is less than the radius of the base portion 13, and said blade portion lies wholly at one side of a line passing through the center of the base portion 13 parallel to the toothed edge 15.

The base portion 13 is formed to bear against the extended bearing face 4 of mounting plate 1, and is provided at its rearward portion with a slot 17 extending inward from its edge to a position centrally thereof, of sufficient width to receive the pivot member 6. The base portion 13 is also provided with a plurality of openings 18 of identical shape and size extending therethrough at positions spaced from the slot 17. Each of the openings 18 is formed so as to fit closely around any one of the positioning members 11 on the mounting plate 1. The openings 18 are located at positions corresponding to the relative positions of the positioning members 11, being spaced at equal angular intervals about the inner end portion 17' of slot 17. In this case I have shown five such openings 18 spaced at equal angular intervals from each other, corresponding to the angular spacing between the positioning members 11. The openings are preferably of circular shape, but may be of any desired shape to conform to the shape of the positioning members.

A clamping member C is provided for securing the blade structure B to the blade-carrying handle structure A. The clamping member C is shown as a cylindrical nut member having a knurled or machined peripheral surface 21 and a central bore whose outer portion 22 is threaded to engage the threads 7 of pivot member 6 and whose inner end portion is counterbored or enlarged as indicated at 22a so as to pass freely over the inner portion 8 of said pivot member 6.

The clamping member C is provided at its inner face with an annular recess 23 of sufficient depth and radial extent to receive and pass over the positioning members 11 when the clamping member is moved inward to clamping position as described hereinafter. The flat inner face of clamping member C is formed to bear against the flat base portion 13 of blade structure B to clamp said base portion firmly between the clamping member and the mounting plate 1. For this purpose, the flat inner face of the mounting member includes an annular face portion 24 disposed radially inward of the recess 23 and another annular face portion 25 disposed radially outward of the recess 23, said face portions lying in a common plane for concurrent clamping engagement with the base portion 13 at positions both inside and outside the position of the circular row of openings 18.

The interengaging threads on clamping member C and pivot member 6 are of sufficient length to provide for screw movement of the clamping member inward to a closed position of clamping engagement with the blade structure base portion 13, as described above and shown in full lines in Fig. 5, and outward to an open position such as indicated in dot-dash lines at C' in Fig. 5, to release the base portion 13 and permit removal or insertion thereof between the clamping member and the mounting plate 1.

It will be noted that, when the clamping member is in this latter position, the inner face portions 24 and 25 of the clamping member are spaced outward beyond the outer ends of positioning members 11 by a distance greater than the thickness of the blade structure base portion 13. The positions of inner face portions 24 and 25 at this time are indicated at 24' and 25' in Fig. 5, and it will be seen that sufficient clearance is provided between the clamping member and the outer ends of the positioning members 11 to permit the base portion 13, after movement to the dot-dash position shown at 13', to pass readily therebetween so as to permit the base portion 13 to be removed by longitudinal or sliding movement toward the right in Fig. 5, or to be inserted by movement toward the left in Fig. 5, or to be rotated to bring different ones of the openings 18 in position to engage the respective positioning members 11.

To mount the blade structure B on the handle structure A, the clamping member C is moved to the open position C' and the blade structure base portion 13 is then inserted, as described above, by moving the blade structure in the direction indicated by the arrow at D in Fig. 3 so as to receive the pivot member 6 slidingly within the slot 17 until the inner end 17' of said slot engages the smooth-surfaced portion 8 of said pivot member. With the parts in this position, the blade structure B may be rotated about the pivot member 6 to any desired angular position in which selected ones of the openings 18 are alined with the respective positioning members 11. The base portion 13 is then moved toward the mounting plate to engage the selected openings with the positioning members and lock the blade structure in the selected angular position, and the clamping member C is then screwed inward to clamping position as described above.

By loosening the clamping member C as described above, the blade structure B may be moved to the dot-dash position shown in Fig. 5 and may then be removed or rotated to a different angular position relative to the handle structure. When the blade portion 14 and its toothed edge 15 are positioned as shown in full lines in Fig. 1, the three openings 18 nearest the rear end of the toothed edge are in engagement with the three positioning members 11, while the openings indicated at 18a and 18b are free from such engagement. By rotating the blade clockwise until the opening 18a is engaged with one of the members 11, the blade will be disposed in a different angular position relative to the handle, as shown in dot-dash lines at 14a. By rotating the blade counter-clockwise from the full line position until the opening 18b is engaged with one of the members 11, the blade will be positioned at still another angle relative to the handle, as indicated in dot-dash lines at 14b.

In Fig. 1, one face of the blade structure base portion 13 is in engagement with the bearing face 4 of mounting plate 1, and the toothed edge 15 is located at the side of the blade which faces in a clockwise direction about the axis of pivot member 6. By removing the blade structure B, it may be turned over and reinserted in a relatively reversed position, in which the other face of base portion 13 engages the bearing face 4 of plate 1 and the toothed edge of the blade is located at the side of the blade which faces in a counter-clockwise direction about the axis of the pivot member 6, as illustrated in Figs. 6 and 7. With the blade in this relatively reversed position, it may again be positioned at different angles relative to the handle structure, as illustrated, for example, at 14c in Fig. 6, at 14d in Fig. 7, or as shown in dot-dash lines at 14e in Fig. 7.

The blade portion 14 is similar in shape to a keyhole saw such as is ordinarily used for cutting small holes. However, it differs from an ordinary keyhole saw in that it is offset with respect to the center of the base portion 13 and its toothed edge 15 is tangent to the periphery of said base portion, and it is therefore adapted for cutting small holes in walls or other members in close proximity to other walls. This is particularly true when the blade is in either of the positions shown at 14 or 14b in Fig. 1, or in any of the positions shown in Fig. 6 or Fig. 7, in which both the blade structure B and the handle structure A, as well as the clamping member C, lie wholly at one side of a line extending along the toothed edge 15.

For example, when the blade is mounted in the position shown in full lines in Fig. 1, the saw is particularly useful for cutting small holes in a ceiling, in close proximity to a vertical wall, the hand grip 2 being disposed at a convenient angle for use in such work and in such position as to permit cutting movement without interference by the adjacent vertical wall. In a similar manner, when the blade is mounted as shown in Fig. 6, the saw is especially adapted for cutting small holes in a vertical wall in close proximity to a ceiling or other horizontal wall.

Examples of other types of blade structures that may be mounted on the same handle structure A, in place of the blade structure B, are illustrated in Figs. 8 through 11.

Fig. 8 shows a blade structure $B_1$ comprising a thin flat base portion 28 and a narrow elongated blade portion 29 which is also similar in shape and utility to a key hole or compass saw. The base portion 28 is provided with a slot 31 comparable to slot 17 described above, for receiving the pivot member 6, and with a single opening 32 adapted to engage any one of the positioning members 11.

The base portion 28 is relatively narrow so as to fit between the adjacent positioning members 11 when the opening 32 engages the middle one of said members to mount the blade with the handle structure A in the relative position shown in full lines in Fig. 8. However, the base portion 28 is preferably of sufficient length in the direction of the blade to extend across the full diameter of the clamping member C so as to provide ample area for clamping engagement between said clamping member and the bearing face 4 of mounting plate 1. The base portion is therefore provided at each side with a notch or recess 33 for receiving one of the positioning members 11 when the blade is shifted to a different angular position relative to the handle structure. For example, if the handle structure is rotated relative to the blade, to bring the mounting plate to the position shown in dot-dash lines at 1a, the lowermost positioning member 11 will engage the opening 32 and the uppermost positioning member will be shifted to a position within the upper notch 33, as shown in dot-dash lines at 11a.

It will be apparent that the blade structure $B_1$ may be adjusted to any one of three different angular positions relative to the handle structure A, in which the opening 32 engages a selected one of the three positioning members 11, and may also be mounted in a relatively reversed position with respect to the handle structure so as to bring the toothed edge 30 at the upper side of the blade portion 29 instead of the lower side as shown. The blade structure may be secured to the handle structure in any of these positions by clamping the base portion 28 firmly between the clamping member C and the bearing face 4 of mounting plate 1, in the same manner as described above.

Fig. 9 shows a blade structure $B_2$ having a blade portion 35 similar in shape to a small standard saw for general work, provided with a toothed edge 36; Fig. 10 shows a blade structure $B_3$ adapted for use as a hack saw, having a frame 37 carrying a demountable narrow blade 38 provided with a toothed edge 39; and Fig. 11 shows a blade structure $B_4$ similar to a hack saw, having a blade portion 41 provided with a toothed edge 42 at one side and a stiffening back member 43 at the other side. Each of the blade structures $B_2$, $B_3$ and $B_4$ comprises a thin flat base portion 45 at the rear end thereof. The base portion 45 is comparable to the base portion 13 described above, being provided with a slot 46 extending inward from the rear edge thereof and similar in shape and function to the slot 17, and with a plurality of openings 47 similar in shape, location and function to the openings 18. Each of these blade structures may be mounted on the handle structure A and secured thereto by clamping member C, may be adjusted to different angular positions relative to the handle structure, and may be mounted in either of two relatively reversed positions, all as described above in connection with Figs. 1–7. By way of example, another angular position of the handle structure relative to the blade structure $B_2$ is illustrated by the position of the mounting plate shown in dot-dash lines at 1b in Fig. 9, the corresponding position of the upper positioning member being indicated in dot-dash lines at 11b.

Possible modifications in certain parts of the handle structure and the clamping member are illustrated in Fig. 12. The handle structure $A_1$ comprises a mounting plate 51 provided as before with a hand grip 2 secured thereto. The mounting plate is generally similar to the plate 1 described above and is provided with a pivot member secured thereto centrally of the bearing face 4 and projecting laterally therefrom in a position corresponding to pivot member 6. In this case, however, the pivot member comprises a screw 52 mounted in a threaded bore 53 in plate 51, and a threaded cylindrical sleeve 54 mounted on the inner portion of the screw, leaving the outer end portion of the screw exposed for threaded engagement with the clamping member $C_1$. The mounting plate is provided, as before, with a plurality of angularly spaced positioning members 55 similar in shape to the positioning members 11 and similarly located with respect to each other and to the pivot member. Instead of being formed integrally with the mounting plate 1 as shown in Fig. 5, each of these positioning members may be formed as a short externally shouldered tubular element rigidly secured to the plate 51, as by riveting or upsetting the lower end thereof.

The clamping member $C_1$ is provided with a central bore whose outer portion 56 is threaded to engage the screw 52 of the pivot member and whose inner portion 56a is counterbored or enlarged to pass freely over the cylindrical sleeve 54. It is also provided, as before, with an annular recess 23 to receive and pass freely over the positioning members 55, and with flat inner face portions 24 and 25.

The clamping member $C_1$ is similar in operation to the member C described above, and the modified construction shown in Fig. 12 may be used in conjunction with any of the above described blade structures, such as the blade structure B, whose base portion 13 is shown clamped between the inner face of member $C_1$ and the bearing face 4 of plate 51. As before, the positioning members 55 project laterally from the mounting plate a substantially shorter distance than the pivot member 52, so as to provide for sufficient clearance between the inner face of the clamping member $C_1$ and the outer ends of the positioning member to permit insertion, removal and rotative adjustment of the blade structure when the clamping member is screwed outward to an open position comparable to that described above and illustrated in dot-dash lines in Fig. 5.

I claim:

1. In an adjustable saw, the combination comprising: a handle structure having a mounting plate provided at one side with an extended flat bearing face, and a hand grip secured to said mounting plate; a pivot member secured to said plate and projecting laterally from said bearing face; a plurality of positioning members secured to said plate and projecting laterally from said bearing face a shorter distance than said pivot member, said positioning members being equally spaced from said pivot member and being spaced from each other at equal angular intervals about said pivot member; a blade structure having at its rear end a thin flat base portion engaging said bearing face; said base portion having a slot extending inward from its edge, of such width as to receive said pivot member; said base portion also having a plurality of openings therethrough spaced from said slot and spaced at equal angular intervals about the inner end portion of said slot, the angular intervals of said openings being equal to those of said positioning members so that a plurality of said openings can receive and engage a plurality of said positioning members when said pivot member extends within the inner end portion of said slot; and a clamping member threadedly engaging said pivot member for screw movement toward and away from said plate by rotation of said clamping member relative to said plate and said pivot member, said clamping member having an inner face formed to engage and clamp said base portion between said inner face and the bearing face of said plate, and also having an annular recess extending outward from said inner face concentric with said pivot member and of such depth and radial extent as to receive said positioning members during screw movement of said clamping member toward said plate to bring said inner face into engagement with said base portion.

2. In an adjustable saw, the combination comprising: a blade-carrying handle structure having a mounting plate provided at one side with an extended flat bearing face, and a hand grip secured to said mounting plate; a pivot member secured to said plate and projecting laterally from said bearing face; a plurality of positioning members secured to said plate and projecting laterally from said bearing face a shorter distance than said pivot member, said positioning members being equally spaced from said pivot member and being spaced from each other about said pivot member; and a clamping member threadedly engaging said pivot member for screw movement toward and away from said plate by rotation of said clamping member relative to said plate and said pivot member; said clamping member being provided with an annular recess extending outward from its inner end concentric with said pivot member, and with inner face portions disposed radially inward and radially outward of said recess, said recess being of such depth and radial extent as to receive said positioning members during screw movement of said clamping member toward said plate to a closed position in which said inner face portions are in close proximity to said bearing face of the mounting plate; and said clamping member and pivot member having interengaging threads of sufficient length to provide for screw movement of the clamping member between said closed position and an open position in which said inner face portions of the clamping member are spaced outward beyond the outer ends of the positioning members.

3. In an adjustable saw, the combination comprising: a blade-carrying handle structure having a mounting plate provided at one side with an extended flat bearing face, and a hand grip secured to said mounting plate; a pivot member secured to said plate and projecting laterally from said bearing face; a plurality of positioning members secured to said plate and projecting laterally from said bearing face a shorter distance than said pivot member, said positioning members being equally spaced from said pivot member and being spaced from each other about said pivot member; and a clamping member having a central bore threadedly engaging said pivot member for screw movement of said clamping member inward and outward relative to said mounting plate by rotation of said clamping member relative to said plate and said pivot member; said clamping member having a flat inner face opposing the bearing face of said mounting plate in position to engage and clamp a blade structure between said inner face and said bearing face upon movement of said clamping member inward to a closed position in which said inner face is in close proximity to said bearing face; and said clamping member also having an annular recess extending outward from said inner face, concentric with said central bore and of such depth and radial extent as to receive said positioning members during screw movement of said clamping member inward to said closed position.

References Cited in the file of this patent

UNITED STATES PATENTS

| | | |
|---|---|---|
| 236,890 | Heysinger | Jan. 25, 1881 |
| 558,655 | Mohr | Apr. 21, 1896 |
| 730,542 | Kemp | June 9, 1903 |
| 784,674 | Haag | Mar. 14, 1905 |
| 2,146,777 | Strong | Feb. 14, 1939 |
| 2,194,785 | Brubaker | Mar. 26, 1940 |
| 2,579,728 | Cesaroni | Dec. 25, 1951 |
| 2,604,130 | Derby | July 22, 1952 |
| 2,621,689 | Fordon | Dec. 16, 1952 |